(12) United States Patent
Mattern et al.

(10) Patent No.: US 10,943,283 B2
(45) Date of Patent: Mar. 9, 2021

(54) SERVICE LOCATION RECOMMENDATION TAILORING

(71) Applicant: Cummins Inc., Columbus, IN (US)

(72) Inventors: Michael F. Mattern, Columbus, IN (US); Kelli Jean Hoehn, Columbus, IN (US); Gautam Matkar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 659 days.

(21) Appl. No.: 15/356,281

(22) Filed: Nov. 18, 2016

(65) Prior Publication Data

US 2018/0144388 A1     May 24, 2018

(51) Int. Cl.
   *G06Q 30/06*     (2012.01)
   *G06Q 10/08*     (2012.01)
   *G07C 5/08*      (2006.01)
   *G01C 21/36*     (2006.01)
   *G07C 5/00*      (2006.01)

(52) U.S. Cl.
   CPC ..... *G06Q 30/0631* (2013.01); *G01C 21/3679* (2013.01); *G06Q 10/087* (2013.01); *G07C 5/0816* (2013.01); *G07C 5/008* (2013.01); *G07C 5/0808* (2013.01)

(58) Field of Classification Search
   CPC ............. G06Q 10/087; G06Q 30/0631; G07C 5/0816; G07C 5/0808; G07C 5/008; G01C 21/3679
   See application file for complete search history.

(56) References Cited

U.S. PATENT DOCUMENTS

| | | |
|---|---|---|
| 6,112,150 A | 8/2000 | Irons et al. |
| 6,170,742 B1 | 1/2001 | Yacoob |
| 6,301,531 B1 | 10/2001 | Pierro et al. |
| 6,769,162 B1 | 8/2004 | Barich et al. |
| 7,130,768 B2 | 10/2006 | Hofmeister et al. |
| 7,209,860 B2 | 4/2007 | Trsar et al. |
| 7,590,476 B2 | 9/2009 | Shumate |
| 7,856,299 B2 | 12/2010 | Fink et al. |
| 8,019,503 B2 | 9/2011 | Andreasen et al. |
| 8,055,400 B2 | 11/2011 | Grenn |
| 8,060,274 B2 | 11/2011 | Boss et al. |
| 8,090,495 B2 | 1/2012 | Fink et al. |
| 8,301,333 B2 | 10/2012 | Singh et al. |
| 8,412,402 B2 | 4/2013 | Underdal et al. |
| 8,463,485 B2 | 6/2013 | Howell et al. |
| 8,792,913 B2 | 7/2014 | Bennett, Jr. |
| 8,886,389 B2 * | 11/2014 | Edwards .............. G01C 21/362 |
| | | 455/404.2 |
| 8,996,235 B2 | 3/2015 | Singh et al. |
| 9,234,471 B2 * | 1/2016 | Young ................. F02D 41/1461 |
| 9,329,049 B2 * | 5/2016 | Edwards ............ G01C 21/3605 |
| 9,335,180 B2 * | 5/2016 | Sinton .................. G01C 21/343 |
| 9,355,549 B2 * | 5/2016 | McClintic .............. G06Q 10/06 |
| 9,384,597 B2 | 7/2016 | Koch et al. |
| 9,471,903 B1 * | 10/2016 | Adderly ............ G06Q 10/1095 |

(Continued)

*Primary Examiner* — Russell Frejd
(74) *Attorney, Agent, or Firm* — Foley & Lardner LLP (57) ABSTRACT

Systems, apparatuses, and methods disclosed provide for recommending service locations. The method includes analyzing fault data and location positioning data of a vehicle provided via an onboard telematics device, determining one or more service sites based on the analysis, and presenting the one or more service sites to a customer.

24 Claims, 3 Drawing Sheets

(56) References Cited

U.S. PATENT DOCUMENTS

| | | | |
|---|---|---|---|
| 9,792,738 B1* | 10/2017 | Adderly | G06Q 10/1095 |
| 10,032,139 B2* | 7/2018 | Adderly | G06Q 10/1095 |
| 2002/0101361 A1 | 8/2002 | Barich et al. | |
| 2002/0138185 A1 | 9/2002 | Trsar et al. | |
| 2007/0271269 A1 | 11/2007 | Chen et al. | |
| 2008/0015748 A1* | 1/2008 | Nagy | G07C 5/008 |
| | | | 701/31.4 |
| 2008/0121684 A1* | 5/2008 | Gualandri | B60R 25/1004 |
| | | | 235/375 |
| 2009/0037780 A1 | 2/2009 | Nakagaki et al. | |
| 2009/0089134 A1* | 4/2009 | Uyeki | G06Q 10/02 |
| | | | 705/7.19 |
| 2009/0216493 A1 | 8/2009 | Underdal et al. | |
| 2009/0254240 A1 | 10/2009 | Olsen et al. | |
| 2011/0225096 A1 | 9/2011 | Cho et al. | |
| 2012/0053778 A1* | 3/2012 | Colvin | G07C 5/008 |
| | | | 701/29.4 |
| 2012/0123629 A1* | 5/2012 | Edwards | G01C 21/3407 |
| | | | 701/29.1 |
| 2012/0136743 A1* | 5/2012 | McQuade | G06Q 30/0611 |
| | | | 705/26.3 |
| 2012/0136802 A1* | 5/2012 | McQuade | G06Q 30/0282 |
| | | | 705/347 |
| 2012/0296567 A1* | 11/2012 | Breed | G01C 21/26 |
| | | | 701/468 |
| 2013/0030641 A1 | 1/2013 | Olsen et al. | |
| 2013/0046432 A1* | 2/2013 | Edwards | G01C 21/3605 |
| | | | 701/29.4 |
| 2013/0124032 A1 | 5/2013 | Singh et al. | |
| 2014/0088866 A1* | 3/2014 | Knapp | G06Q 10/06 |
| | | | 701/467 |
| 2014/0277995 A1* | 9/2014 | Slaton | F01N 11/00 |
| | | | 701/102 |
| 2014/0288831 A1* | 9/2014 | Sinton | G01C 21/20 |
| | | | 701/533 |
| 2014/0379208 A1 | 12/2014 | McQuade et al. | |
| 2015/0066781 A1 | 3/2015 | Johnson et al. | |
| 2015/0269793 A1 | 9/2015 | Collins et al. | |
| 2016/0071338 A1* | 3/2016 | McQuade | G06Q 30/0282 |
| | | | 701/51 |
| 2016/0148439 A1* | 5/2016 | Akselrod | G07C 5/085 |
| | | | 701/23 |
| 2016/0148442 A1* | 5/2016 | Kuemmel | G07C 5/008 |
| | | | 701/31.4 |
| 2016/0153806 A1* | 6/2016 | Ciasulli | G06F 11/0751 |
| | | | 702/184 |
| 2016/0203657 A1 | 7/2016 | Bell et al. | |
| 2016/0342456 A1* | 11/2016 | McQuade | G07C 5/008 |
| 2016/0343177 A1* | 11/2016 | McQuade | G07C 5/008 |
| 2017/0076344 A1* | 3/2017 | McQuade | G06Q 30/0611 |
| 2017/0087990 A1* | 3/2017 | Neti | B60L 3/0061 |
| 2017/0228709 A1* | 8/2017 | Dhaliwal | G06Q 20/18 |
| 2017/0308864 A1* | 10/2017 | Kelley | G06Q 10/20 |
| 2017/0308865 A1* | 10/2017 | Kelley | G06Q 10/1095 |
| 2019/0003929 A1* | 1/2019 | Shapiro | G01M 99/005 |

* cited by examiner

SERVICE LOCATION RECOMMENDATION TAILORING

TECHNICAL FIELD

The present disclosure relates to systems and methods for recommending service locations for vehicles.

BACKGROUND

A customer can find locations for vehicle services (e.g., a customer service site, an OEM service site, a dealer site, a distributor site, a repair shop) by inquiring a call center or a website operated by, for example, a manufacturer. In particular, the customer can provide his/her location to the call center or website, and the call center or website can provide a list of service sites in order of, for example, increasing distance from the customer's location. The customer can also provide information such as vehicle identification number (VIN), make, model, year of production of the vehicle, etc. to further refine the inquiry. Recommendations of service sites suitable for the customer's needs are generally desired.

SUMMARY

One embodiment relates to an apparatus for recommending service location. The apparatus comprises a data analysis circuit structured to analyze fault data and location positioning data of a vehicle provided via an onboard telematics device, a service site determination circuit structured to determine one or more service sites based on the analysis, and a service site presentation circuit structured to present the one or more service sites to a customer.

Another embodiment relates to a method for recommending service location. The method comprises analyzing fault data and location positioning data of a vehicle provided via an onboard telematics device, determining one or more service sites based on the analysis, and presenting the one or more service sites to a customer.

Yet another embodiment relates to a system for recommending service location. The system comprises a communication interface structured to transmit and receive data, a database structured to store information of a plurality of service sites, and a controller communicably coupled to the communication interface and the database. The controller is structured to analyze fault data and location positioning data of a vehicle provided via an onboard telematics device, determine one or more service sites from the plurality of service sites based on the analysis, and present the one or more service sites to a customer via the communication interface.

These and other features, together with the organization and manner of operation thereof, will become apparent from the following detailed description when taken in conjunction with the accompanying drawings.

DETAILED DESCRIPTION

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, the various embodiments disclosed herein relate to systems and methods for recommending service location(s) for a vehicle. The vehicle can transmit its fault information and location positioning information to a remote server through a telematics system. In general, telematics is the convergence of telecommunications and information processing, which involves receiving, processing, and sending information via telecommunication devices. Telematics systems have been widely used in various vehicular applications. The server can immediately analyze the fault and location information and determine one or more service sites based on the analysis. The determined service site(s) is reachable by the vehicle, capable of performing the diagnosis and repair, and convenient for the customer. The server then recommends the determined service site(s) to the customer through a user interface, such as an operator interface on the vehicle, or through email, text message, mobile application, etc. Information provided by the server may include the identity, location, distance, opening hours, and/or map of the service site(s). For example, the vehicle incurs an engine malfunction while heading to a destination. The onboard telematics device transmits the malfunction information and location positioning information of the vehicle to a remote server. The server determines a service site that is open when the vehicle arrives before the engine is automatically shut down. Ideally, the service site is on the way to the destination and has some nearby amenities if it will take a long time to repair the engine.

Figure 1:
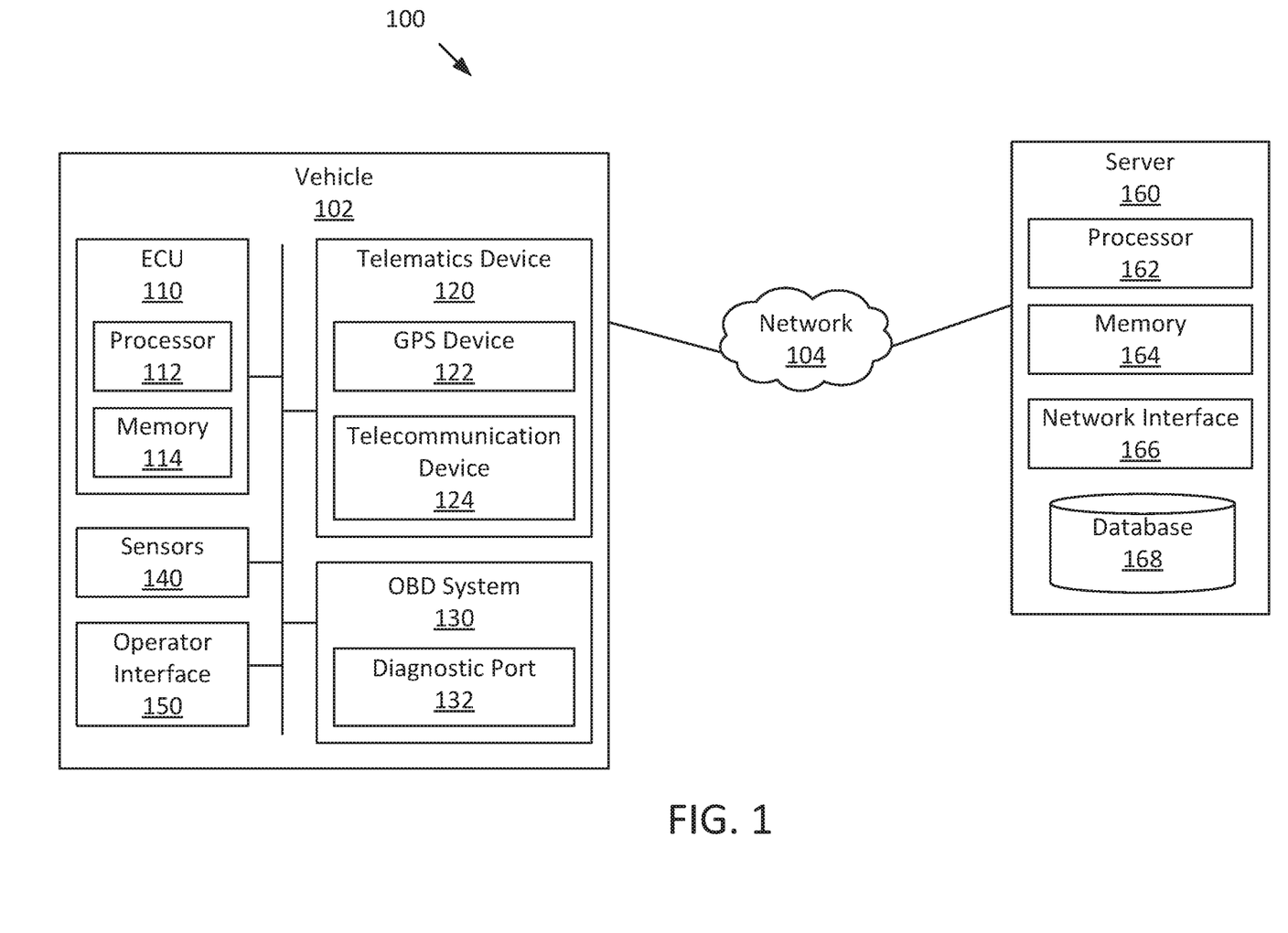
FIG. 1 is a block diagram of a computing environment for recommending service location(s) for a vehicle according to an example embodiment.

Referring now to FIG. 1, a block diagram of a computing environment 100 for recommending service site(s) for a vehicle is shown according to an example embodiment. The computing environment 100 includes a vehicle 102 and a server 160 communicating with each other via a network 104.

The vehicle 102 may be any type of passenger or commercial automobile, such as a car, truck, sport utility vehicle, cross-over vehicle, van, minivan, automobile, tractor. Moreover, the vehicle 102 may include other types of vehicles such as a motorcycle, plane, helicopter, locomotive, or railway car. The vehicle 102 may generally include a fuel tank, engine, powertrain system, and wheels (not shown in the present figure). The vehicle 102 is shown to include an electronic control unit (ECU) 110, a telematics device 120, an on-board diagnostic (OBD) system 130, sensors 140, and an operator interface 150. Components of the vehicle 102 may communicate with each other via any number of wired or wireless connections. For example, a wired connection may include a serial cable, a fiber optic cable, a CAT5 cable, or any other form of wired connection. In comparison, a wireless connection may include the Bluetooth, Wi-Fi, cellular, radio, etc. In one embodiment, components of the vehicle 102 are connected to a vehicle network such as a control area network (CAN) or a manufacturer proprietary network.

The ECU 110 includes a processor 112 and a memory 114. The memory 114 stores various instructions that, when executed by the processor 112, control the operation of various components and/or subsystems of the vehicle 102. For example, the ECU 110 may include an electronic fuel injection control unit, engine mobilizer control unit, aftertreatment system control unit, etc. The processor 112 may be implemented as a general-purpose processor, an application specific integrated circuit (ASIC), one or more field programmable gate arrays (FPGAs), a digital signal processor (DSP), a group of processing components, or other suitable electronic processing components. The memory 114 may include one or more tangible, non-transient volatile memory or non-volatile memory, e.g., NVRAM, RAM, ROM, Flash Memory, hard disk storage, etc.). Moreover, the memory 114 may include database components, object code components, script components, or any other type of information structure.

The OBD system 130 may be structured to diagnose the performance of the components and subsystems of the vehicle 102, such as ECU, ABS system, heating/air conditioning system, brake system, transmission system, and so on. Sensors 140 are positioned throughout the vehicle 102 to monitor the operational status and condition of a wide range of components and subsystems of the vehicle 102. For example, sensors 140 can measure engine temperature/speed/load, battery voltage, aftertreatment system emission, tire pressure, fuel tank level, etc. The OBD system 130 may receive data indicative of operational status and conditions of the components and subsystems monitored by the sensors 140. Based on the data, the OBD system 130 diagnoses malfunctions or deterioration in performance of the components and subsystems. In one example, if a monitored parameter falls outside of a normal range of operation, the OBD system 130 may generate a fault code indicative of the abnormal parameter. For instance, if the engine coolant level falls outside of a predefined normal operating range, the OBD system 130 will issue a fault code indicating that the engine coolant level is low. In another example, if a subsystem or component fails or is unable to send its output due to an open or short-circuit, the OBD system 130 may generate a fault code indicative of the failure to read the parameter. For instance, wires may be shorted high or shorted low, which would generate wiring faults; some part of the wiring harness might be disconnected with the key on, which would generate datalink-related faults. In further embodiments, the fault code generated is stored in the memory 114. It should be noted that different manufactures may have different fault code systems.

The OBD system 130 may indicate the diagnosed fault at the operator interface 150 of the vehicle 102. The operator interface 150 enables an operator of the vehicle 102 to read status and conditions of the vehicle 102. For example, the operator interface 150 may include, but is not limited to, an interactive display (e.g., a touchscreen, etc.), a dashboard, a control panel, etc. The operator interface 150 may display the fault information reported by the OBD system 130 for the operator to read. For example, the check engine light on the dashboard may be turned on when the OBD system 130 diagnoses a fault of the engine. The tire air pressure light may be turned on when the OBD system 130 determines the tire air pressure is outside of the normal operational range, and so on.

The OBD system 130 includes a diagnostic port 132 through which an off-board service tool can access the OBD system 130. The off-board service tool may be used at a service site, which may be an OEM handheld scan tool/code reader or a computing device (e.g., smartphone, laptop) installed with the off-board diagnostic software (e.g., Cummins Insite®). The diagnostic port 132 is a hardware interface, such as a 16-pin serial port, a D-shaped serial port disposed, for example, underneath the dashboard of the vehicle 102. In some embodiments in which the vehicle 102 is a truck, the diagnostic port 132 may be a 6 or 9-pin serial port disposed in the truck's interior. Communication between the OBD system 130 and the off-board diagnostic service tool may follow different protocols, for example but not limited to, SAE J1939, J1708/J1587, J1850 VPW, J1850 VPWM, ISO 9141-2, Keyword 2000, and CAN. Besides the fault information (e.g., fault codes), other vehicle conditions and status information such as vehicle identification number (VIN), mileage, engine speed, etc. can also be accessed via the diagnostic port 132. The VIN is unique to each vehicle and includes information about its make, model, year (and month) of production, and serial number.

The telematics device 120 installed on the vehicle 102 is structured to transmit information relating to the vehicle 102 obtained onboard to a remote server 160 and receive information from the server 160 via the network 104. In some embodiments, the server 160 can immediately diagnose the fault and provide actionable information to the user instantly. In some embodiments, the telematics device 120 is an OEM device embedded in the vehicle 102. In other embodiments, the telematics device 120 is an aftermarket standalone device, e.g., a telematics box coupled to the vehicle 102 through, for example, the diagnostic port 132. The telematics device 120 may obtain the fault information by accessing the OBD system 130. In some embodiments, the telematics device 120 may integrate certain telecommunication functions. For example, a navigation system within the vehicle 102 may be included in the telematics device 120.

The telematics device 120 includes a GPS device 122 and a telecommunication device 124. The GPS device 122 tracks the location of the vehicle 102 (e.g., latitude and longitude data, elevation data, etc.). The telecommunication device 124 communicates with the server 160 over the network 104. Although not shown in FIG. 1, the telecommunication device 124 may include an antenna, a radio frequency (RF) transceiver, and a subscriber identity module (SIM). The telecommunication device 124 may follow any type of mobile communications protocol, for example but not limited to, cellular, satellite, radio, Wi-Fi, WiMax, Bluetooth, Zigbee, GSM, GPRS, LTE, and the like.

The server 160 may receive vehicle-related data from the telematics device 120, store and analyze the data, and notify the customer of the service information through the telematics device 120, and/or through email, text message, mobile application, etc. For example, at the moment an engine system fault occurs, the telematics device 120 may instantly transmit key engine system and GPS data to the server 160. The server 160 may immediately analyze the data and provide actionable information to the operator, e.g., provide the fault information and one or more service sites at the operator interface 150 and/or through email or text message. In further embodiments, besides telematics devices on vehicles, the server 160 receives vehicle-related information from other sources. For example, the server 160 can receive information relating to warranty claims, and/or repair information from service providers around the world via the network 104. In some embodiments, the server 160 is implemented as a central computing system hosted by a component manufacturer, a vehicle manufacturer, a telematics provider, an OEM, or multiple parties. In some embodiments, the telematics server 160 is implemented as a cloud network including multiple computing systems, which can share and transfer vehicle information and data store, and coordinate to process the received data.

The server 160 includes a processor 162, a memory 164, a network interface 166, and a database 168. The memory 164 stores various instructions that, when executed by the processor 162, control the operation of the server 160. The network interface 166 allows the server 160 to send and receive data to and from external devices via the network 104. The network interface 166 may be a wireless network interface that communicates with a wireless communication protocol (e.g., 802.11a/b/g/n, Bluetooth®, ZigBee®, CDMA, GSM, LTE, WiMax, etc.) or a wired communication protocol (e.g., Ethernet, USB, Thunderbolt®, etc.). The database 168 is structured to receive and store, hold, and otherwise serve as a repository for vehicle information, service site information, and other information (e.g., warranty information). In some embodiments, the database 168 may be a separate component relative to the telematics server 160. For example, due to the potential high volume or quantity of data stored by the database 168, the database 168 may be formed or constructed from two or more server-based storage components stored over two or more remote geographic locations.

In some embodiments, the vehicle information stored in the database 168 includes the VIN, make/model of the vehicle, product recalls, historical repair history, currently known problems of the vehicle, and so on. In some embodiments, the service site information stored in the database 168 includes identifier, location, opening hours, stock, qualification, etc. of service sites. For example, a dealerships may be identified as being capable of providing diagnosis and repair services involving various components and subsystems, such as engine, ABS system, heating/air conditioning system, brake system, transmission system, and so on. An aftermarket service provider might be identified as qualifying to provide limited diagnosis/repair services, such as oil change, tire inflation, etc. In some embodiments, the server 160 can receive or retrieve information relating to the service sites from computing systems operated by the service providers or third parties (e.g., search engine) around the world via the network 104 and store the information in the database 168. In further embodiments, the database 168 may also include one or more classification and/or categorization functions (e.g., logic processing, etc.). The classification function may sort, categorize, or otherwise classify each piece of information according to various parameters.

The network 104 may include private networks, public networks, or a combination thereof. In some embodiments, the network 104 includes the Internet. The network 104 may be a combination of wireless and wired networks. The wireless network may be any type of wireless network, for example, a satellite or cellular network using protocols such as Global System for Mobile Communications (GSM), Code Division Multiple Access (CDMA), General Packet Radio Service (GPRS), Long Term Evolution (LTE), High Rate Packet Data (HRPD), Wi-Fi, Personal Communications Service (PCS), etc. The wired network may be any type of wired network, for example, Ethernet network, Local Talk, Fiber Distributed Data Interface (FDDI), etc.

Figure 2:
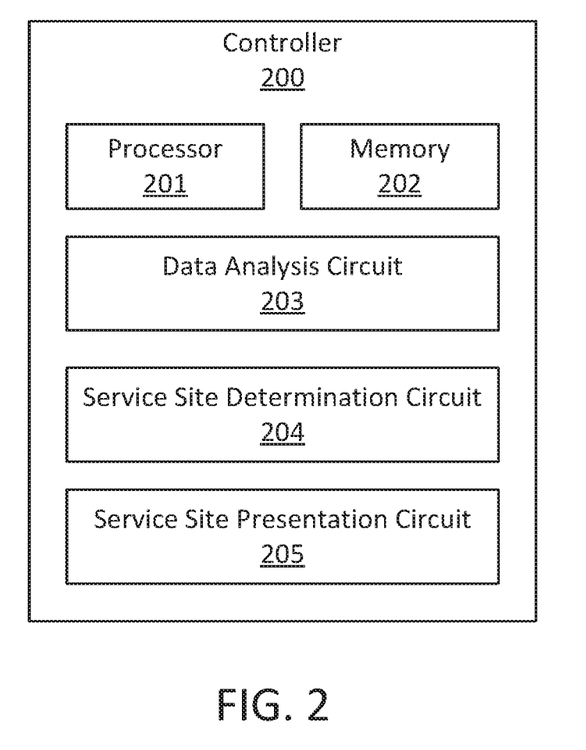
FIG. 2 is a block diagram of a controller for recommending service location(s) for a vehicle, according to an example embodiment.

Referring now to FIG. 2, a schematic diagram of a controller 200 for recommending service sites is shown according to an example embodiment. The controller 200 can be implemented on the server 160. The controller 200 includes a processor 201, a memory 202, and various circuits 203 through 205. The processor 201 may be implemented as any type of processor including an application specific integrated circuit (ASIC), one or more field programmable gate arrays (FPGAs), a digital signal processor (DSP), a group of processing components, or other suitable electronic processing components. The memory 202 may include one or more tangible, non-transient volatile memory or non-volatile memory, e.g., NVRAM, RAM, ROM, Flash Memory, hard disk storage, etc.). Moreover, the memory 202 may include database components, object code components, script components, or any other type of information structure.

The controller 200 includes various circuits 203 through 205 for completing the activities described herein. In one embodiment, the circuits of the controller 200 may utilize the processor 201 and/or memory 202 to accomplish, perform, or otherwise implement various actions described herein with respect to each particular circuit. In this embodiment, the processor 201 and/or memory 202 may be considered to be shared components across each circuit. In another embodiment, the circuits (or at least one of the circuits) may include their own dedicated processing circuit having a processor and a memory device. In this latter embodiment, the circuit may be structured as an integrated circuit or an otherwise integrated processing component. In yet another embodiment, the activities and functionalities of circuits may be embodied in the memory 202, or combined in multiple circuits, or as a single circuit. In this regard and while various circuits with particular functionality are shown in FIG. 2, it should be understood that the controller 200 may include any number of circuits for completing the functions and activities described herein. For example, the activities of multiple circuits may be combined as a single circuit, as an additional circuit(s) with additional functionality, etc. Further, it should be understood that the controller 200 may further control other activity beyond the scope of the present disclosure.

Certain operations of the controller 200 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The controller 200 includes a data analysis circuit 203, a service site determination circuit 204, and a service site presentation circuit 205. Through the circuits 203-205, the controller 200 is structured to analyze fault data and location positioning data of the vehicle 102 provided via an onboard telematics device, determine one or more service sites for the vehicle 102 based on the analysis, and present the one or more service sites to a customer.

The data analysis circuit 203 is structured to analyze fault data and location positioning data of the vehicle 102 provided via the onboard telematics device 120. As discussed above, the vehicle 102 includes the sensors 140 positioned throughout the vehicle 102 to monitor a wide range of subsystems and components and generate various operational parameters of the vehicle 102, such as engine temperature, battery voltage, aftertreatment system emission, tire pressure, coolant level, coolant temperature, oil pressure, oil temperature, manifold air temperature, etc. The OBD system 130 receives data indicative of operational status and conditions of the components and subsystems from the sensors 140 and diagnoses malfunctions or deterioration in performance. The OBD system 130 can generate fault data when a monitored parameter falls outside of a normal range of operation, a component fails or is unable to send its output due to an open or short-circuit, or the like. In some embodiments, the fault data is in the form of fault codes each representing an error that has occurred in the vehicle operation. Different manufacturers may have different fault code systems. For example, in Cummins fault code system, fault code "3376" represents "DPF incomplete regeneration," "3582" represents "SCR catalyst conversion efficiency low," "3543" represents "NOx limits exceeded," and so on. The telematics device 120 accesses the OBD system 130 to obtain the fault codes. Besides fault codes, the telematics device 120 may also obtain readings of the sensors 140 from the OBD system 130 and/or the ECU 110, such as coolant level, coolant temperature, oil pressure, oil temperature, manifold air temperature, etc. The telecommunication device 124 transmits the fault data and the location positioning data determined by the GPS device 122 to the controller 200 (implemented on the server 160) for analysis via the network 104. In further embodiments, the telecommunication device 124 transmits other vehicle information along with the fault codes and the location positioning data to the controller 200, such as VIN, make, model, year of production, destination set in the navigation system, etc.

In some embodiments, the data analysis circuit 203 is structured to identify an engine derate of the vehicle 102 based on the fault data. The ECU 110 limits the maximum engine speed and/or torque below nominal values (i.e., derates the engine) or even shuts down the engine under harmful operating conditions, e.g., when the engine coolant and/or the engine oil is low, in order to protect the engine from damaging. When the engine is derated, the vehicle 102 may not be able to climb steep terrain because of inadequate torque. In operation, the sensors 140 monitor relevant engine parameters for the vehicle 102, such as coolant level, coolant temperature, oil level, oil temperature, manifold air temperature, etc. When the parameters exceed predefined thresholds for safe operation, the ECU 110 provides torque and/or speed derate to protect the engine and provides alerts through the operator interface 150 (e.g., turns on the low coolant light). Meanwhile, the OBD system 130 generates fault data (e.g., fault code) on what parameters were exceeded and for how long. The data analysis circuit 203 identifies the engine derate based on the fault data generated by the OBD system 130 and transmitted by the telematics device 120. In some embodiments, the engine performance is derated as a function of the severity of the fault. For example, when the coolant/oil level is below a first threshold, torque derate schedule is implemented in which the engine torque is derated as a linear function of the elapsed time since the derate is triggered. When the coolant/oil level is below a second threshold lower than the first threshold, speed derate schedule is implemented additionally or alternatively in which the engine speed is derated as a linear function of the elapsed time. In other embodiments, a look-up table specifying correspondence between maximum torque/speed and coolant/oil level is used for derate schedule. It should be understood that the example derate schedules are discussed herein for illustration not for limitation. Any suitable engine derate schedule can be implemented for the vehicle 102. The data analysis circuit 203 may receive the derate schedule from the vehicle 102 or retrieve the derate schedule from the database 168 by using identifier, make, model, year of production of the vehicle 102 and/or the engine.

In some embodiments, the data analysis circuit 203 is structured to identify an impending engine derate or shutdown. As discussed above, the ECU 110 may derate or shut down the engine under certain harmful operating conditions. The data analysis circuit 203 can determine when an impending derate or shutdown is going to occur based on fault data or other vehicle related data. For example, based on the coolant/oil level continually monitored by the sensors 140, coolant/oil consumption rate can be determined, as well as the difference between the current coolant/oil level and the threshold level that triggers engine derate. Thus, how much time left to the impending engine derate can be determined by using, for example, a predefined model or a look-up table. In some embodiments, the ECU 110 maintains a timer indicating how much time left to the engine derate. The data analysis circuit 203 receives the timer through the telematics device 120. In some embodiments, the data analysis circuit 203 receives the readings of the sensors 140 and determines when the engine derate is going to occur based on the sensor readings. In another example, an engine derate schedule is being implemented on the vehicle 102, in which the torque and/or speed is derated with the elapsed time (e.g., linearly) since the derate is triggered. Thus, how much time left to the engine shutdown can be determined based on the engine derate schedule and the elapsed time. In some embodiments, the ECU 110 maintains a timer indicating how much time left to the engine shutdown. The data analysis circuit 203 receives the timer through the telematics device 120. In some embodiments, the data analysis circuit 203 receives the fault code(s) relating to engine derate and corresponding timestamps and determines the time left based on these data.

In some embodiments, the data analysis circuit 203 is structured to identify a root cause of faults based on the fault data of the vehicle 102. In some embodiments, the root cause is represented by one fault code from multiple fault codes received from the vehicle 102. In particular, when multiple fault codes are received from the vehicle 102, the data analysis circuit 203 categorizes what the fault code relates to (e.g., voltage, ECM, etc.) and determines a priority for each fault code. The higher the priority, the more likely that fault code is the root cause of the problem. The fault code with the highest priority may be designated as the first root cause. In some embodiments, the data analysis circuit 203 includes a fault code analyzer as disclosed in the U.S. patent application Ser. No. 14/219,755, which is incorporated herein in its entirety by reference. The fault code analyzer can put the multiple fault codes in sequence and point to up to three root cause fault codes. In further embodiments, the data analysis circuit 203 is structured to identify a replacement part of vehicle to address the root cause. For example, the root cause points to a component, the failure of which might have caused the fault.

In some embodiments, the data analysis circuit 203 is further structured to determine an estimated period of time to address the root cause. In some embodiments, the estimated period of time is determined based on statistics of history data of diagnosis/repair time associated with the determined root cause. For example, the server 160 can collect warranty claims, which include diagnosis/repair time and repair information including fault codes, from all around the world and store the data in the database 168. The data analysis circuit 203 uses the determined root cause fault code(s) to query the database 168, which returns the historical diagnosis/repair time relating to the root cause. The data analysis circuit 203 can pick a size (e.g., 5, 10, 15, 20, etc.) of samples from the historical data of labor time associated with the root cause, and determines the estimated period of time to be a predefined percentile for the historical labor time. For example, the estimated time can be determined to be a value that is higher than 75% of the sampled labor hours but not higher than the rest 25% of the sampled labor hours. It should be understood that the percentile 75% is given for illustration not for limitation. Other suitable percentile can also be used, such as 60%, 65%, 70%, 80%, and so on. In some embodiments in which multiple root causes are identified, the estimated labor time can be a sum of estimated labor time for each root cause or the estimated labor time for one of the root cause (e.g., the time for the first root cause, the longest time). It should be understood that the method disclosed herein for determining the estimated period of time to address the root cause is for illustration not for limitation, any suitable approach can be used for determining the estimated diagnosis/repair time.

In some embodiments, the data analysis circuit 203 is structured to identify a direction that the vehicle 102 is heading. In some embodiments, the operator of the vehicle 102 has set a destination location in the navigation system of the vehicle 102. The data analysis circuit 203 receives the destination location through the telematics device 120. In some embodiments, the GPS device 122 continually tracks the location of the vehicle 102. The data analysis circuit 203 determines the direction that the vehicle 102 is heading based on the location positioning data tracked by the GPS device 122.

The service site determination circuit 204 is structured to determine one or more service sites for the vehicle 102 based on the analysis conducted by the data analysis circuit 203. Ideally, the determined service site(s) is reachable by the vehicle 102, capable of performing the diagnosis and repair, and convenient for the customer.

In some embodiments, the service site determination circuit 204 is structured to determine one or more service sites based on altitude and/or terrain for the vehicle 102 to travel from the current location to the one or more service sites when the vehicle 102 is under engine derate. When the engine is derated, the vehicle 102 might not be able to climb steep terrain or go above a certain altitude because of inadequate torque. The service site determination circuit 204 excludes the service sites that are located above a threshold altitude or would make the vehicle 102 to climb steep terrain to arrive. In one example, the service site determination circuit 204 sets a threshold slope corresponding to determination that the vehicle 102 is under engine derate. The threshold slope may be a fixed value or a value that changes with the severity of derate. For example, the more the engine is derated, the smaller the threshold slope is set. The service site determination circuit 204 then compares the slopes of the route leading to each nearby service site with the threshold slope. In some embodiments, the route to a service site is divided into multiple segments, each having a corresponding slope. If any slope on the route exceeds the threshold, the service site determination circuit 204 determines not to recommend the service site. If the slopes on the route are within the threshold, the service site determination circuit 204 determines to recommend the service site if other criteria are satisfied. In another example, corresponding to determining that the vehicle 102 is under engine derate, the service site determination circuit 204 sets a threshold altitude. The threshold altitude may be a fixed value or a value that changes with the severity of derate and/or the altitude of the current location of the vehicle 102. For example, the more the engine is derated, the smaller the threshold altitude is set. The lower the current altitude is, the smaller the threshold altitude is set. The service site determination circuit 204 then queries the database 168 for nearby service sites (e.g., within 10 miles, 25 miles, 50 miles, etc.) and compares the altitude of each service site with the threshold altitude. If the altitude of the service site exceeds the threshold, the service site determination circuit 204 determines not to recommend the service site. If the altitude of the service site is within the threshold, the service site determination circuit 204 determines to recommend the service site if other criteria are satisfied.

In some embodiments, the service site determination circuit 204 is structured to determine the one or more service sites based on an expected distance the vehicle travels before the engine derate or shutdown occurs. The data analysis circuit 203 maintains or reports a timer that indicates how much time left to an impending engine derate or shutdown. The service site determination circuit 204 determines an expected distance the vehicle 102 can travel before the derate/shutdown happens based on the timer and a vehicle speed. The vehicle speed can be an average speed of the vehicle over a latest period of time (e.g., 1 minute, 5 minutes, 20 minutes, 1 hour, etc.). The service site determination circuit 204 then queries the database 168 for service sites within the expected distance. In some embodiments, the service site determination circuit 204 sets a margin (e.g., 5 miles, 10 miles, etc.) for the expected distance. For the service sites within the expected distance, the service site determination circuit 204 applies other criteria, if available.

In some embodiments, the service site determination circuit 204 is structured to determine the one or more service sites that have an expected replacement part in stock, when the root cause identified by the data analysis circuit 203 suggests that the failure of the part has caused the fault. The service site determination circuit 204 queries the database 168 for service sites that have the replacement part in stock. In some embodiments, a service site reports its stock to the server 160 on a periodic basis (e.g., daily, weekly, etc.) or upon request through, for example, a computing system operated by the service site or a third party. For the service sites that have the expected replacement part in stock, the service site determination circuit 204 applies other criteria, if available.

In some embodiments, the service site determination circuit 204 is structured to determine the one or more service sites based on the estimated period of time to address the root cause. In particular, if the data analysis circuit 203 determines that the estimated period of time for diagnosing/repairing the identified root cause is longer than a threshold period of time (e.g., 4 hours, 5 hours, 8 hours, etc.), the service site determination circuit 204 then queries the database 168 for service sites that have amenities (e.g., overnight accommodation, food, fuel, attractions, etc.) nearby. For example, if the estimated diagnosis/repair time is 4 hours, the service site determination circuit 204 determines whether a service site has any nearby restaurant within walking distance (e.g., half mile) by using an online map or a stored map. If not, the service site determination circuit 204 determines not to recommend the service site. If the service site has, the service site determination circuit 204 determines to recommend the service site if other criteria are satisfied. In some embodiments, the service site determination circuit 204 checks the nearest amenity for each service site and ranks the services sites based on the distance to the nearest amenity.

In some embodiments, the service site determination circuit 204 is structured to determine the one or more service sites along the direction the vehicle 102 is heading. The data analysis circuit 203 determines the heading direction based on the destination location set in the navigation system of the vehicle 102 or the location positioning data continually tracked by the GPS device 122. The service site determination circuit queries the database 168 for service sites that are on the way the vehicle 102 is heading so as to allow the customer to make progress in the mission rather than backtracking.

In some embodiments, the service site determination circuit 204 is structured to determine the one or more service sites based on opening hours of the one or more sites. The service site determination circuit 204 queries the database 168 for service sites that are currently opening. In some embodiments, the service site determination circuit 204 sets a margin (e.g., 5 minutes, 10 minutes, 30 minutes, 1 hours, etc.) to allow the vehicle 102 to reach the service site and be fixed. If the service site is closed or will be closed when the vehicle arrives, the service site determination circuit 204 determines not to recommend. If the service site is open when the vehicle arrives, the service site determination circuit 204 determines to recommend the service site if other criteria are satisfied.

The service site presentation circuit 205 is structured to present the one or more service sites determined by the service site determination circuit 204 to the customer. In some embodiments, the service site presentation circuit 205 presents information about the one or more service sites to the customer through the operator interface 150. In some embodiments, the recommended service sites are presented to the customer through an email, a text message, or a mobile application installed on a user device (e.g., smartphone, tablet), or a website that can be browsed by a computer, a smartphone, a tablet, and so on. The information relating to service site can be transmitted via the network 104. In some embodiments, the service site presentation circuit 205 presents the one or more service sites using at least one of identity, location, map, opening hours, and contact information of the one or more service sites. For example, the service site presentation circuit 205 can generate an email to the customer, listing the recommended one or more service sites with their identification, location, phone number, and opening hours. Multiple service sites can be ranked based on the distance from the current location of the vehicle 102 and/or other characteristics. In another example, the service site presentation circuit 205 presents the identification and location of the one or more service sites on a touch screen of the navigation system of the vehicle 102. The customer can select a service site through the touch screen. Upon selection, the navigation system displays the route and guides the customer to the service site. It should be understood that the protocols of presentation disclosed herein are for illustration not for limitation. Any suitable protocols of presentation can be used.

Figure 3:
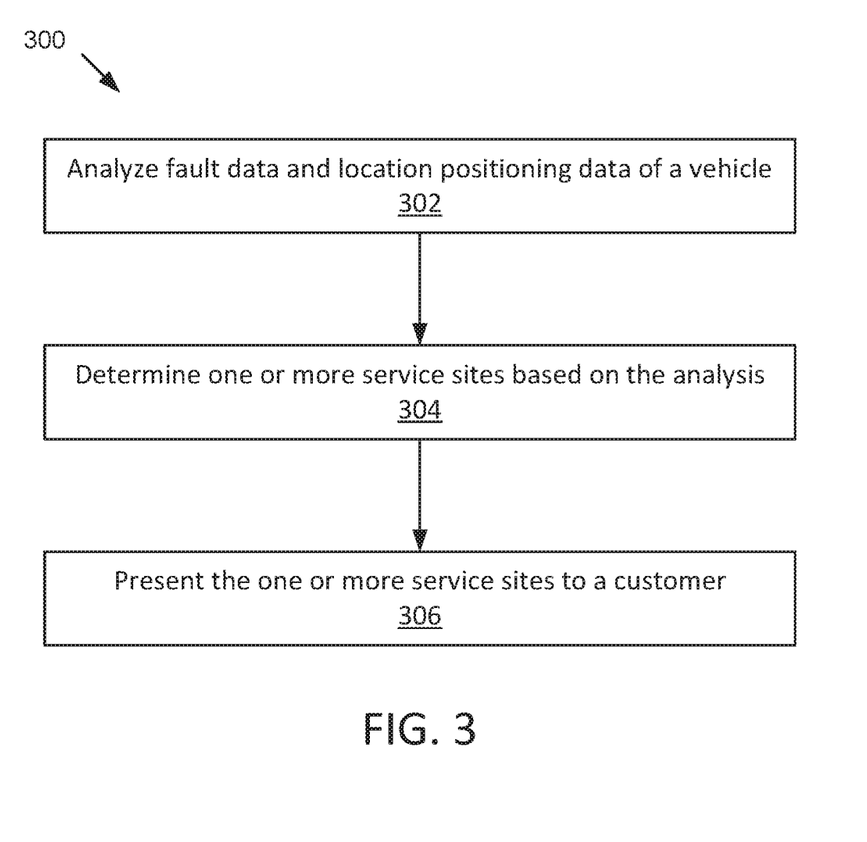
FIG. 3 is a flow diagram of a method for recommending service location(s) for a vehicle, according to an example embodiment.

Referring now to FIG. 3, a flow diagram of a method 300 for recommending service sites for a vehicle is shown according to an example embodiment. The method 300 may be executed by the controller 200.

At a process 302, fault data and location positioning data of the vehicle 102 provided via the onboard telematics device 120 is analyzed. Fault data is generated (e.g., by the OBD system 130) when a vehicle parameter falls outside of a normal range of operation, a component fails or is unable to send its output due to an open or short-circuit, or the like. In some embodiments, the fault data is in the form of fault codes that each represent an error that has occurred in the vehicle operation. Other information relating to the vehicle status and condition can be analyzed along with the fault codes and the location positioning data, such as VIN, make, model, year of production, destination set in the navigation system, etc. In some embodiments, an engine derate of the vehicle 102 is identified based on the fault data. The engine can be derated or even shut down under certain harmful operating conditions. A fault code indicating the engine derate is generated when coolant level, coolant temperature, oil level, oil temperature, manifold air temperature, etc., exceed predefined thresholds for safe operation. In some embodiment, the fault data further indicates how long the engine has been derated and the derate schedule being implanted on the engine. In some embodiments, an impending engine derate or shutdown is identified based on fault data and/or other vehicle related data. For example, coolant/oil consumption rate, as well as the difference between the current coolant/oil level and the threshold level that triggers engine derate, can be determined based on the coolant/oil level continually monitored by the sensors 140. Thus, how much time left to the impending engine derate can be determined by using, for example, a predefined model or a look-up table. In another example, an engine derate schedule is being implemented on the vehicle 102, in which the torque and/or speed is derated with the elapsed time (e.g., linearly) since the derate is triggered. Thus, how much time left to the engine shutdown can be determined based on the engine derate schedule and the elapsed time. A timer may be set which indicates how much time left to the engine derate/shutdown.

In some embodiments, a root cause of faults is determined based on the fault data of the vehicle 102. In some embodiments, the root cause is represented by one fault code from multiple fault codes received from the vehicle 102. For example, a priority for each fault code is determined based on which category the fault code relates to. The fault code with the highest priority may be designated as the first root cause. In some embodiments, the multiple fault codes are put in sequence and up to three root cause fault codes are identified. In further embodiments, a replacement part of vehicle is identified, the failure of which part might have caused the fault. In some embodiments, an estimated period of time to address the root cause is determined. In some embodiments, the estimated period of time is determined based on statistics of history data of diagnosis/repair time associated with the determined root cause. For example, a size (e.g., 5, 10, 15, 20, etc.) of samples is picked from the historical data of diagnosis/repair time associated with the root cause. The estimated time can be determined to be a value that is higher than 75% of the sampled labor hours but not higher than the rest 25% of the sampled labor hours. In some embodiments in which multiple root causes are identified, the estimated labor time can be a sum of estimated labor time for each root cause or the estimated labor time for one of the root cause. It should be understood that the method disclosed herein for determining estimated period of time to address the root cause is for illustration not for limitation, any suitable approach can be used for determining the estimated diagnosis/repair time.

In some embodiments, a direction that the vehicle 102 is heading is identified. In some embodiments, the heading directed is determined based the destination location set in the navigation system of the vehicle 102. In some embodiments, the heading direction is determined based on the location positioning data continually tracked by the GPS device 122.

At a process 304, one or more service sites are determined for the vehicle based on the analysis. Ideally, the determined service site(s) is reachable by the vehicle 102, capable of performing the diagnosis and repair, and convenient for the customer. In some embodiments, the one or more service sites is determined based on altitude and/or terrain for the vehicle 102 to travel from the current location to the one or more service sites when the vehicle 102 is under engine derate. A threshold altitude is set when the engine is being derated, which may be a fixed value or a value that changes with the severity of derate and/or the altitude of the current location of the vehicle 102. For example, the more the engine is derated, the smaller the threshold altitude is set. The lower the current altitude is, the smaller the threshold altitude is set. If the altitude of the service site exceeds the threshold, the service site is not recommended to the customer. If the altitude of the service site is within the threshold, the service site can be recommended to the customer if other criteria are satisfied. In another example, a threshold slope is set corresponding to determination that the vehicle 102 is under engine derate, which may be a fixed value or a value that changes with the severity of derate. For example, the more the engine is derated, the smaller the threshold slope is set. The slopes of the route leading to each service site are compared with the threshold slope. In some embodiments, the route to a service site is divided into multiple segments, each having a corresponding slope. If any slope on the route exceeds the threshold, the service site is not recommended. If the slopes on the route are within the threshold, the service site can be recommended to the customer if other criteria are satisfied.

In some embodiments, the one or more service sites is determined based on an expected distance the vehicle travels before the engine derate or shutdown occurs. A timer can be maintained which indicates how much time left to an impending engine derate or shutdown. An expected distance the vehicle 102 can travel before the derate/shutdown happens is determined based on the timer and a vehicle speed. The vehicle speed can be an average speed of the vehicle over a latest period of time (e.g., 1 minute, 5 minutes, 20 minutes, a hour, etc.). In some embodiments, a margin (e.g., 5 miles, 10 miles, etc.) can be set for the expected distance. The service sites outside of the expected distance are not recommended. The service sites within the expected distance are recommended, if other criteria are satisfied.

In some embodiments, the one or more service sites are determined based on whether they have an expected replacement part in stock, which part might have caused the fault. In some embodiments, the stock information of the service site is updated periodically (e.g., daily, weekly, etc.) or upon request. Service sites that have the expected replacement part in stock are recommended, if other criteria are satisfied. Service sites that do not have the expected replacement part in stock are not recommended.

In some embodiments, the one or more service sites are determined based on the estimated period of time to address the root cause. In particular, if the estimated period of time for diagnosing/repairing the identified root cause is longer than a threshold period of time (e.g., 4 hours, 5 hours, 8 hours, etc.), the service sites that have amenities (e.g., overnight accommodation, food, fuel, attractions, etc.) nearby (e.g., within walking distance) are recommended if other criteria are satisfied. Service sites that do not have nearby amenities are not recommended. In some embodiments, the service sites are ranked based on the distance to the nearest amenity.

In some embodiments, the one or more service sites along the direction the vehicle 102 is heading are recommended so as to allow the customer to make progress in the mission rather than backtracking. In some embodiments, the one or more service sites are determined based on opening hours of the sites. In some embodiments, a margin (e.g., 5 minutes, 10 minutes, 30 minutes, 1 hours, etc.) is set to allow the vehicle 102 to reach the service site and be fixed. Service sites that are closed or will be closed when the vehicle arrives are not recommended. Service sites that are open when the vehicle arrives are recommended if other criteria are satisfied.

At a process 306, the one or more determined service sites are presented to a customer. In some embodiments, information relating to the one or more recommended service sites is presented to the customer through the operator interface 150. In some embodiments, the recommended service sites are presented to the customer through an email, a text message, or a mobile application installed on a user device, or a website that can be browsed by a computer, a smartphone, a tablet, and so on. In some embodiments, the one or more service sites are presented using at least one of identity, location, map, opening time, and contact information of the one or more service sites. For example, an email to the customer is generated, which lists the recommended one or more service site with their identification, location, phone number, and opening hours. Multiple service sites can be ranked based on the distance from the current location of the vehicle 102 and/or other characteristics. In another example, the identification and location of the one or more service sites are displayed on a touch screen of the navigation system of the vehicle 102. The customer can select a service site through the touch screen. Upon selection, the navigation system displays the route and guides the customer to the service site. It should be understood that the protocols of presentation disclosed herein are for illustration not for limitation. Any suitable protocols of presentation can be used.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the controller of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
a data analysis circuit structured to analyze fault data and location positioning data of a vehicle provided via an onboard telematics device, the data analysis circuit structured to identify an engine derate of the vehicle and an associated impending shutdown based on the fault data, the engine derate limiting at least one of a maximum engine speed or a maximum engine torque for the vehicle;
a service site determination circuit structured to determine one or more service sites based on the analysis of the fault data, a time stamp of the fault data, and the engine derate associated with the impending shutdown, wherein the one or more service sites are reachable before the impending shutdown; and
a service site presentation circuit structured to present the one or more service sites to a customer.

2. The apparatus of claim 1, wherein the service site determination circuit is structured to determine the one or more service sites based on altitude and/or terrain for the vehicle to travel from a current location to the one or more service sites.

3. The apparatus of claim 1, wherein the data analysis circuit is structured to identify a direction the vehicle is heading, and wherein the service site determination circuit is structured to determine the one or more service sites along the heading direction.

4. The apparatus of claim 1, wherein the data analysis circuit is structured to identify a root cause of faults and a replacement part of the vehicle to address the root cause, and wherein the service site determination circuit is structured to determine the one or more service sites that have the replacement part in stock.

5. The apparatus of claim 1, wherein the data analysis circuit is structured to identify a root cause of faults and determine an estimated period of time to address the root cause, and wherein the service site determination circuit is structured to determine the one or more service sites based on the period of time.

6. The apparatus of claim 5, wherein the service site determination circuit is further structured to determine the one or more service sites based on opening time of the one or more service sites.

7. The apparatus of claim 1, wherein the service site presentation circuit is structured to present the one or more service sites to the customer through at least one of an onboard operator interface of the vehicle, an email, a text message, a mobile application, or a web site.

8. The apparatus of claim 1, wherein the service site presentation circuit is structured to present the one or more service sites using at least one of identity, location, map, opening time, or contact information of the one or more service sites.

9. A method comprising:
analyzing fault data and location positioning data of a vehicle provided via an onboard telematics device;
identifying an engine derate and an associated impending shutdown of the vehicle based on the fault data, the engine derate limiting at least one of a maximum engine speed or a maximum engine torque for the vehicle;
determining one or more service sites based on the analysis of the fault data, a time stamp of the fault data, and the engine derate associated with the impending shutdown, wherein the one or more service sites are reachable before the impending shutdown; and
presenting the one or more service sites to a customer.

10. The method of claim 9, further comprising determining the one or more service sites based on at least one of altitude or terrain for the vehicle to travel from a current location to the one or more service sites.

11. The method of claim 9, further comprising identifying a direction the vehicle is heading, and determining the one or more service sites along the heading direction.

12. The method of claim 9, further comprising identifying a root cause of faults and a replacement part of vehicle to address the root cause, and determining the one or more service sites that have the replacement part in stock.

13. The method of claim 9, further comprising identifying a root cause of faults, determining an estimated period of time to address the root cause, and determining the one or more service sites based on the period of time.

14. The method of claim 13, further comprising determining the one or more service sites based on opening time of the one or more sites.

15. The method of claim 9, further comprising presenting the one or more service sites to the customer through at least one of an onboard operator interface of the vehicle, an email, a text message, a mobile application, or a website.

16. The method of claim 9, further comprising presenting the one or more service sites using at least one of identity, location, map, opening time, or contact information of the one or more service sites.

17. A system comprising:
a communication interface structured to transmit and receive data;
a database structured to store information of a plurality of service sites;
a controller communicably coupled to the communication interface and the database, the controller structured to:
analyze fault data and location positioning data of a vehicle provided via an onboard telematics device;
identify an engine derate and an associated impending shutdown of the vehicle based on the fault data, the engine derate limiting at least one of a maximum engine speed or a maximum engine torque for the vehicle;
determine one or more service sites from the plurality of service sites based on the analysis of the fault data, the engine derate associated with the impending shutdown, and a time stamp of the fault data or a grade threshold, wherein the one or more service sites are reachable before the impending shutdown; and
present the one or more service sites to a customer via the communication interface.

18. The system of claim 17, wherein the controller is further structured to determine the one or more service sites based on at least one of altitude or terrain for the vehicle to travel from a current location to the one or more service sites.

19. The system of claim 17, wherein the controller is further structured to identify a direction the vehicle is heading, and determine the one or more service sites along the heading direction.

20. The system of claim 17, wherein the controller is further structured to identify a root cause of faults and a replacement part of vehicle to address the root cause, and determine the one or more service sites that have the replacement part in stock.

21. The system of claim 17, wherein the controller is further structured to identify a root cause of faults, determine an estimated period of time to at least one of diagnose or repair the root cause, and determine the one or more service sites based on the period of time.

22. The system of claim 21, wherein the controller is further structured to determine the one or more service sites based on an opening time of the one or more sites.

23. The system of claim 17, wherein the controller is further structured to present the one or more service sites to the customer through at least one of an onboard operator interface of the vehicle, an email, a text message, a mobile application, or a website.

24. The system of claim 17, wherein the controller is further structured to present the one or more service sites using at least one of identity, location, map, opening time, or contact information of the one or more service sites.

* * * * *